Figure 1:
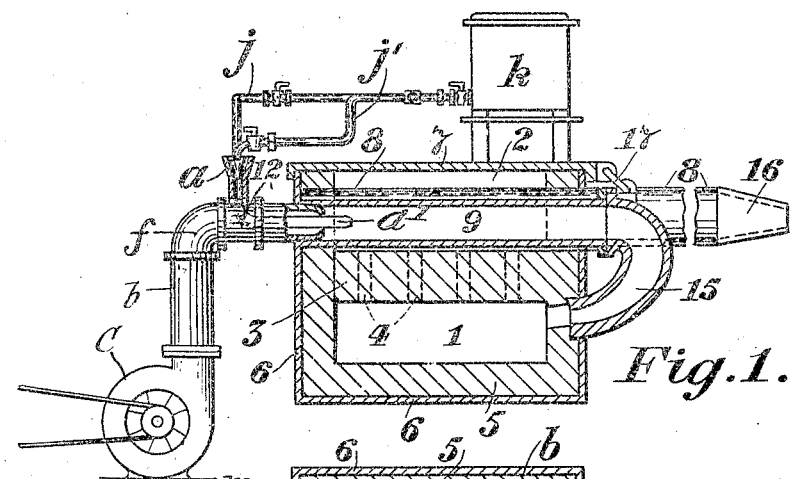

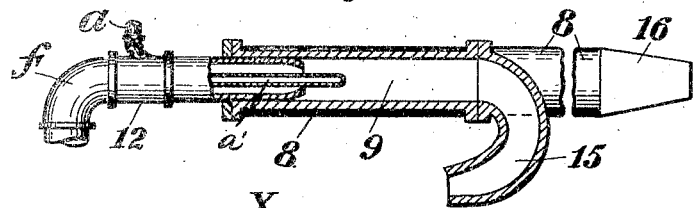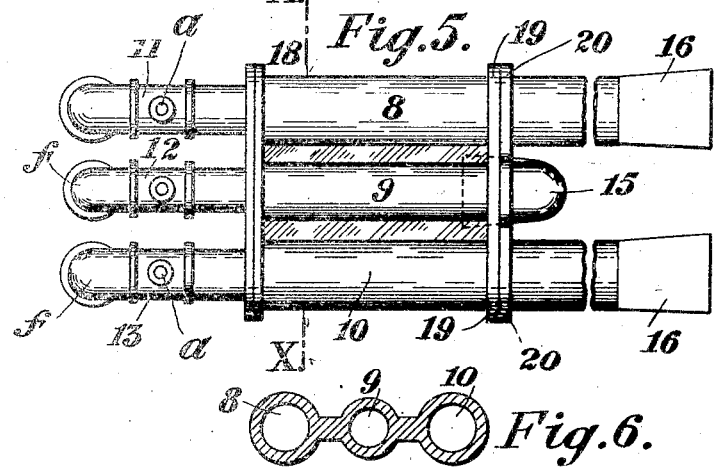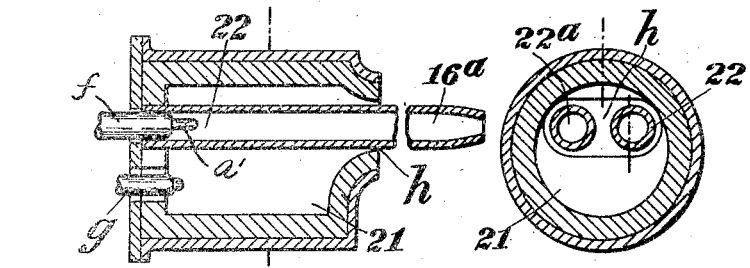

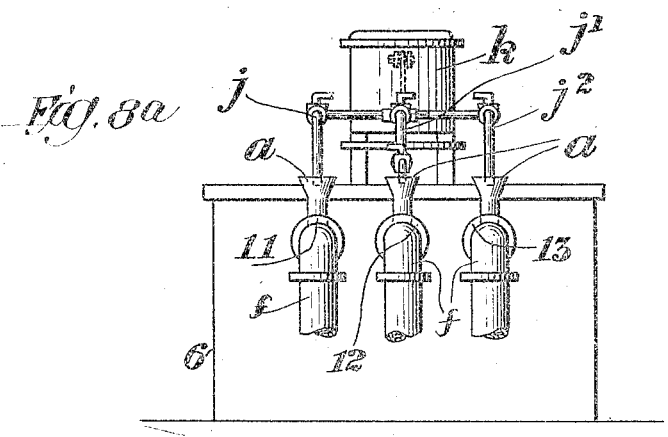
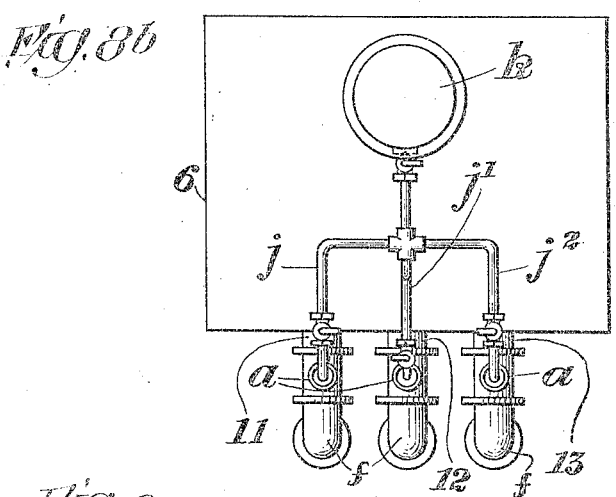
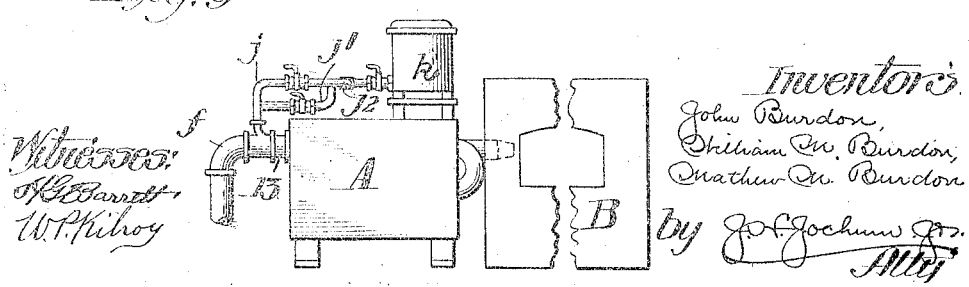

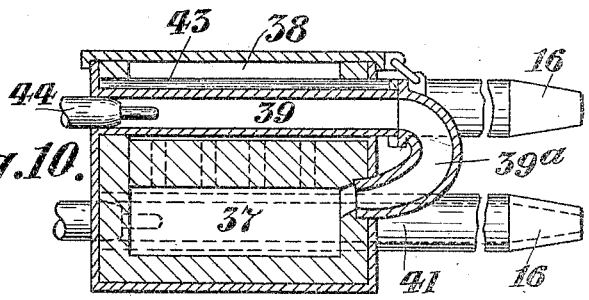
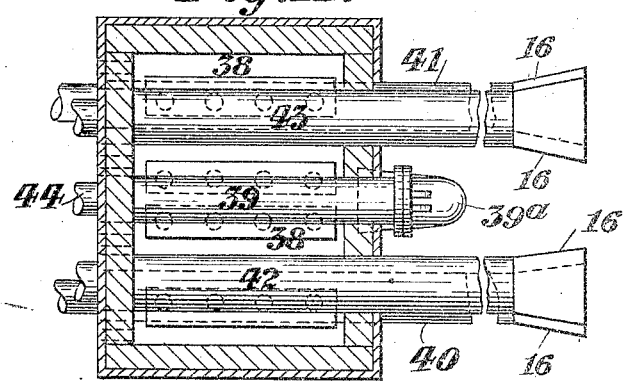
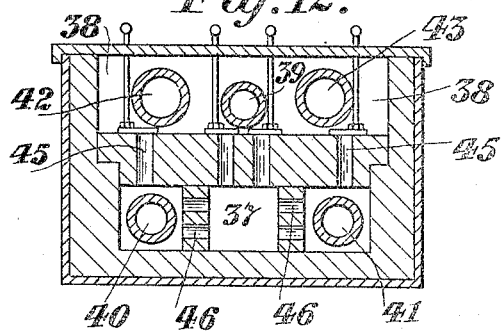

UNITED STATES PATENT OFFICE.

JOHN BURDON, WILLIAM MURRAY BURDON, AND MATTHEW MURRAY BURDON, OF BELLSHILL, SCOTLAND.

OIL-GAS PRODUCER.

1,112,051. Specification of Letters Patent. Patented Sept. 29, 1914.

Application filed February 24, 1911. Serial No. 610,549.

*To all whom it may concern:*

Be it known that we, JOHN BURDON, WILLIAM MURRAY BURDON, and MATTHEW MURRAY BURDON, all subjects of the King of Great Britain, and all residing at Bellshill, Lanarkshire, Scotland, have invented certain new and useful Oil-Gas Producers, of which the following is a specification.

At present when heating furnaces by means of oil fuel it is usual to arrange one or more spray burners in the furnaces or in conjunction therewith, the sprayed oil being burned in the furnace. This method of burning oil fuel has been found wasteful and dirty in operation and is open to various objections. Again, if a burner is used in which oil is simply vaporized, tarry and carbonaceous deposits occur which, apart from reducing the calorific value of the flame, tend to choke the burner and necessitate constant cleaning.

The object of this invention is to provide a simple and self-contained apparatus for producing a substantially stable gas from oils and particularly crude or fuel oils the gas being capable of immediate use for heat-raising purposes without further treatment of any kind.

Under our invention the oil, in a minutely subdivided condition, effected by an atomizer, is introduced in very thorough admixture with a large volume of air to a retort or retorting device comprising one or more open-ended tubes straight through which, or each of which, the mixture is blown, by an air supplying fan or equivalent blower, at a considerable velocity, to a more or less restricted outlet, the mixture, in its rapid passage through the tube or tubes, being highly heated, chemical changes taking place under the action of the heat so that a substantially stable combustible gas is immediately produced without further admixture of air or gas or steam and without the aid of additional piping, appliances or retorts. The gas can be ignited at the outlet and burns with a more or less blue or Bunsen flame. A peculiarity of the apparatus is that although a metallic retort can be employed little or no deposition of carbon takes place therein.

After a great many experiments we have found that the best results can be obtained by very finely subdividing the oil and thoroughly diffusing and mixing the same with the air (this being done by the atomizer, the air passing through the atomizer and coming behind and catching up the oil with which it thoroughly mixes) the mixture passing at once through a retort consisting of a straight open-ended tube having no bends or tortuous passages or connections and which is reduced at its end by means of a tapering nozzle or otherwise, so as to prevent the mixture escaping too rapidly and before gasification has taken place and also to combine and compress the same, the gas being allowed to blow freely into and be ignited in the furnace, chamber, or place to be heated or fired. It is necessary that the tubular retort should be kept at as constant and uniform a heat as possible and this is effected by arranging the retort in a heating chamber or compartment which is kept at a more or less constant temperature by the admission thereto of hot gases from a flame chamber, the gases passing from the flame chamber to the heating chamber being preferably under control. We, preferably, utilize a portion of the gas generated in the apparatus to heat the retort (or retorts) and we simply pass this gas without the employment of a burner or other device into the flame chamber where it is ignited.

We blow the air into the retort through the atomizer, the air being supplied by a rotary fan or equivalent blower C which supplies air in large volume and at a comparatively low pressure.

It is very important that the apparatus should form a self-contained unitary structure so that it can, as desired, be applied to various types and forms of furnaces for heating the same. To this end the apparatus is constructed with one or more straight retorts of tubular shape each constituting an independent gas generator and all being arranged within a suitable structure (which for small work may be portable) the structure having a flame chamber wherein the gas is burned for heating the retort or retorts, means for supplying oil, means for supplying air, means for regulating the supply of oil, atomizers, and means for discharging the generated gas into a furnace or other place to be heated or fired. In certain cases the retort or retorts may be heated by one or more oil burners.

The apparatus, when once started, can be worked automatically so long as the oil and air supply is maintained.

In order that our invention may be properly understood we have hereunto appended explanatory drawings which show, by way of example, different types of oil gas producing apparatus constructed in accordance with our invention.

Figure 2:
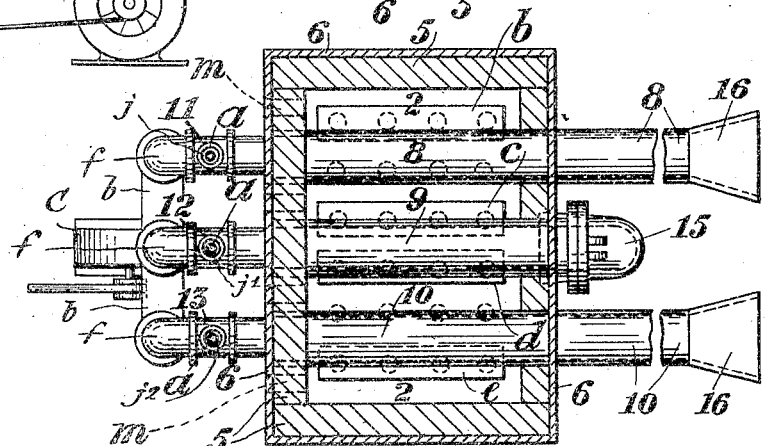
Figure 3:
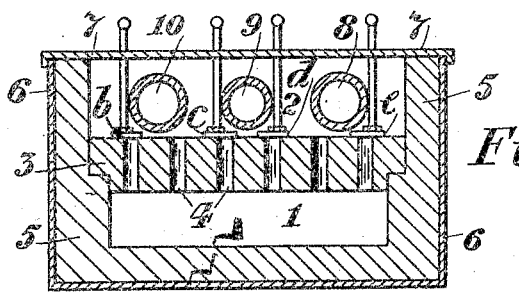

Figure 1 is a longitudinal section, Fig. 2 a sectional plan and Fig. 3 a vertical cross section of one form of self-contained gas producer suitable for heating or firing large furnaces. Fig. 4 is a part longitudinal section, Fig. 5 a plan, and Fig. 6 a cross section on the line X, X, (Fig. 5) of a modified construction of the retorts Figs. 1 to 3. Fig. 7 is a longitudinal section and Fig. 8 a cross section of a simple form of gas producer specially suitable for firing boiler furnaces and such like. Fig. 8$^A$ is a left hand end elevation of an apparatus as shown in Fig. 1. Fig. 8$^B$ is a top plan view of the parts shown in Fig. 8$^A$. Fig. 9 is a view showing how the oil gas producer can be applied to a furnace. Fig. 10 is a vertical section, Fig. 11 a sectional plan and Fig. 12 a vertical cross section of another form of oil-gas producer specially suited for supplying large quantities of gas when heating large furnaces.

On the drawings the same reference numerals and letters wherever repeated indicate the same or similar parts.

The self-contained oil-gas producer, Figs. 1 to 3, consists of a rectangular structure comprising a flame chamber 1 and a superposed heating or retort chamber 2, the chambers being divided from each other by a horizontal partition 3 which is perforated by vertical passages 4 (indicated in dotted lines at Fig. 1). The chambers are, preferably, made of fire-brick 5 with an outer metallic casing 6 and a removable metallic cover 7. The partition is also, preferably, made of fire brick. Located in the retort chamber, side by side, are three tubular retorts 8, 9, 10, two consisting of straight open ended tubes and the third having a tapering return bend.

11, 12, 13, are atomizers, one being provided for and projecting into each retort, (and in each of which the oil issues from a central pipe $a'$ projecting beyond the air nozzle, the air from the pipe $f$ (which is of much greater cross sectional area than the oil pipe, so as to supply a comparatively large volume of air) coming behind the oil and catching it up and carrying it forward. The air is supplied to the pipe from a rotary fan or equivalent blower C. Oil is supplied to the atomizers through pipes $j$, $j'$ and $j^2$ leading from an oil tank $k$ on top of the structure to the inlets $a$ of the atomizers 11, 12 and 13 respectively, and is atomized by means of the fan blast supplied to the pipes $f$ the air blast blowing the oil through the retorts.

The central retort 9 is provided, at its end, with a tapering return bend 15 which is bolted or otherwise secured thereto and is suspended by a link 17 from the cover 7, and leads to the interior of the flame chamber 1. The retorts 8 and 10 are extended beyond the producer and provided at their ends with flattened nozzles 16 for increasing the pressure of the gas before it leaves the retorts.

$m$ are openings in the retort chamber for the products of combustion to escape.

It will be seen that each retort has an atomizer and that each produces its own gas. The oil supplied to each retort is thoroughly atomized by the atomizer and is admixed with a large volume of air from the large pipe $f$ (which, as will be seen, is shown as of about the same diameter as the retort) which blows straight through the retort, the mixture being converted into gas in its passage therethrough. The oil supply for each retort is kept under control by a tap.

The combustible oil gas issuing from the bend 15 of the central retort burns in the flame chamber 1 and the hot gases of combustion pass, by the passages 4, into the retort chamber 2 heating all the retorts. The gas escapes from the retort 8, 10, through the nozzles 16 which latter extend into a furnace or other place to be heated. It is necessary to regulate the heat in the retort chamber so that it shall not, on the one hand, fall so low as not to gasify the oil or, on the other hand, rise to such an extent as to cause ignition of the air and oil mixture to take place in the retorts, and to enable this to be done sliding dampers $b$, $c$, $d$, $e$, for the passages 4 are provided, these dampers being manipulated by rods passing through slots in the cover of the producer or in other suitable manner.

When heating a furnace, the gas producer is fitted in a convenient position adjacent thereto (see Fig. 9) with the nozzles 16, 16, projecting into the interior thereof. The flame chamber is first heated by a blow lamp, burning oil waste, or the like, and when the retort 9 is sufficiently heated, the atomizer 12 is started, the combustible mixture of oil-gas and air passing into the interior of the chamber 1 being there lighted and filling the chamber with flame which passes through the passages 4 into the chamber 2 and highly heats the three retorts 8, 9, 10. The atomizers 11, 13, are then started and the oil and air therefrom is converted into oil gas which issues from the nozzles 16, 16, and burns with a more or less blue or Bunsen flame.

The apparatus shown in Figs. 4, 5, 6, differs from that shown in Figs. 1, 2, 3, in so far as the retorts 8, 9, 10, are cast in one piece and with flange plates 18, 19. The bend 15 and the nozzles 16, 16, may be also made in one piece with or secured to a plate 20 which can be readily bolted to the plate 19.

Figs. 7 and 8 show a smaller form of gas producer with a single chamber 21 lined with fire brick and which serves both as a flame chamber and retort chamber. Two retorts 22, 22ª are arranged, side by side, in this chamber each being provided with an atomizer. An oil or gas burner is arranged at r the flame therefrom playing into the chamber 21 and heating the same and the retorts 22, 22ª, therein. An opening is left at h for the products of combustion to escape. The oil gas from the retorts 22 and 22ª passes by the nozzles (16ª) into the furnace to be heated.

Fig. 9 shows a gas producer A arranged in conjunction with a furnace B so as to heat the same.

The apparatus shown in Figs. 10, 11, 12, is somewhat similar to that shown at Figs. 1, 2, and 3. It has however five retorts 39, 40, 41, 42, 43, two in the flame chamber 37 (partitioned with perforated fire-bricks) and three in the retort chamber 38, the oil from the central atomizer 44 passing into the retort 39 having a return bend 39ª from the end of which the flame plays into the center of the flame chamber 37, and the heat passes both through the vertical passages 45 and the horizontal passages 46 and heats up the retorts 40—43. The combustible mixture of oil gas and air from the retorts 40—43 passes through the nozzles 16 to the furnace to be heated or fired. This gas producer is capable of heating a large furnace.

Of course any suitable number of retorts can be used and be heated by the heat derived from one or more oil-gas flames.

The air may be superheated before passing into the atomizers.

The gas from the nozzles 16 can be used for other purposes than heating or firing furnaces.

With our apparatus the oil-gas can be made both rapidly and cheaply as no tortuous passages are necessary and no elaborate and costly appliances are required.

Having now fully described our invention what we claim and desire to secure by Letters Patent is:—

1. A self contained oil gas producer comprising a flame chamber, a superposed retort chamber, a tubular retort extending through the retort chamber and projecting outward beyond the end thereof, a second retort in the retort chamber having at its end a nozzle deflected into the flame chamber, means for supplying oil to the retorts, and means for atomizing the oil within the retorts by a blast of a large volume of low pressure air, the oil gas flame from the nozzle heating the flame chamber and also both retorts.

2. A self contained oil gas producer comprising a retort chamber, a plurality of retorts in the retort chamber, means for supplying oil to each of the retorts separately, means for atomizing the oil within each retort by blowing into the retort a large volume of low pressure air, and a flame chamber in which oil gas from one of the retorts is burned, hot gases being conducted from the flame to the retort chamber to heat all of the retorts.

3. A self contained oil gas producer comprising a chamber in which oil gas is burned, a second chamber, means for directing the hot gases from the first chamber to the second, two retorts arranged side by side in the said second chamber, means for supplying oil to each retort, means for blowing a large volume of air into each retort to atomize the oil therein, and means whereby oil gas from one retort is conducted to the first chamber to be consumed therein.

4. A self contained oil gas producer comprising a chamber divided by a perforated partition into two compartments, one above the other, the lower one constituting a firing chamber and the upper one a retort chamber, means for heating the firing chamber, a plurality of retorts in the retort chamber, means for suppling oil separately to each of the retorts, means for separately atomizing the oil by directing a blast of a large volume of low pressure air into each retort, and means whereby the oil gas produced in one of the retorts will be discharged directly into the furnace or interior to be heated.

5. A self contained oil gas producer comprising a firing chamber made of fire brick, means for heating the chamber, a retort chamber made of fire brick, an outer metallic casing inclosing the structure, a series of parallel retorts in the retort chamber, means for supplying oil to each of the retorts, means for directing a blast of low pressure air in a large volume into each of the retorts for atomizing the oil therein, and means whereby the oil gas thus produced in one of the retorts may be discharged directly into the furnace or other interior to be heated.

6. A self contained oil gas producer comprising a firing chamber, a retort chamber, a partition provided with passages forming communication between the chambers, a plurality of retorts in the retort chamber, means for supplying oil to each of the retorts, means for forcing a large supply of low pressure air into each retort to atomize the oil therein, and means whereby the oil gas produced in one of the retorts may be discharged into the furnace or other interior to be heated.

7. A self contained oil gas producer comprising a flame chamber, means for supplying fuel to said chamber, a retort chamber, a metallic cover for closing the retort chamber, a partition perforated by passages between the flame chamber and the said retort chamber, a damper for regulating the heat passing to the retort chamber, retorts in the retort chamber each having an outlet at one end projecting outward beyond the chamber, means for supplying oil to each of the retorts separately and means for atomizing the oil within each retort.

8. A self contained oil gas producer comprising a flame chamber, means for supplying fuel thereto, a retort chamber, means for conducting the heated gases from the flame to the retort chamber, retorts in the retort chamber, one or more of the retorts each having an outlet at one end projecting outwardly from the chamber, means for supplying a fluid fuel to the retorts, and a blower having communication with the retorts to atomize the fluid fuel therein.

9. A self contained oil gas producer comprising a flame chamber, means for supplying fuel thereto, a retort chamber, means for conducting the heated gases from the flame to the retort chamber, means for controlling the last said means at will, retorts in the retort chamber, one or more of the retorts each having an outlet at one end projecting outwardly from the chamber, means for supplying a fluid fuel to the retorts, and a blower having communication with the retorts to atomize the fluid fuel therein.

10. A self contained oil gas producer comprising a flame chamber, means for supplying fuel thereto, a retort chamber, means for conducting the heated gases from the flame to the retort chamber, retorts in the retort chamber, one or more of the retorts each having an outlet at one end projecting outwardly from the chamber, provisions for maintaining pressure of the gas in the retort, means for supplying a fluid fuel to the retorts, and a blower having communication with the retorts to atomize the fluid fuel therein.

11. A self contained oil gas producer comprising a flame chamber, means for supplying fuel thereto, a retort chamber, means for conducting the heated gases from the flame to the retort chamber, retorts in the retort chamber, one or more of the retorts each having an outlet at one end projecting outwardly from the chamber, the said outlet end of the retort being constricted to maintain the gas pressure in the retort, means for supplying a fluid fuel to the retorts, and a blower having communication with the retorts to atomize the fluid fuel therein.

12. A self contained apparatus of the character described, embodying a flame chamber and a retort chamber having communication with each other, a plurality of retorts in the retort chamber, a nozzle arranged at one end of one of the retorts and discharging into the flame chamber, the end of another of the retorts projecting beyond the chamber and being adapted to be projected into the area to be heated, means for supplying fluid fuel to the retorts, and a blower connected to the retorts for atomizing the fuel in the retorts.

13. A self contained apparatus of the character described embodying a flame chamber, a plurality of retorts disposed adjacent but outside of said chamber, there being passages leading from the chamber for conducting the heated products of combustion against the retorts, a nozzle arranged at one end of one of the retorts and discharging into the chamber to supply fuel thereto, the other retorts having projecting open ends adapted to extend into the area to be heated, means for supplying fluid fuel to the retorts, and a blower fan connected with the retorts for atomizing the fuel therein.

14. A self contained apparatus of the character described embodying a flame chamber, a plurality of retorts disposed adjacent but outside of said chamber, there being passages leading from the chamber for conducting the heated products of combustion against the retorts, dampers for controlling the said passages, a nozzle arranged at one end of one of the retorts and discharging into the chamber to supply fuel thereto, the other retorts having projecting open ends adapted to extend into the area to be heated, means for supplying fluid fuel to the retorts, and a blower fan connected with the retorts for atomizing the fuel therein.

15. A self contained oil gas producer embodying a flame chamber, a retort chamber, a plurality of retorts in the latter, one of the retorts having one end shaped to form an outlet nozzle arranged to direct the fluid therefrom into the flame chamber, means for supplying fluid fuel to the retorts, and provision for atomizing the fluid fuel within the retorts by a blast of a large volume of low pressure air directed into the retorts, the flame from the nozzle heating the flame chamber and both retorts.

In testimony whereof we affix our signatures in presence of two witnesses.

JOHN BURDON.
WILLIAM MURRAY BURDON.
MATTHEW MURRAY BURDON.

Witnesses:
WILLIAM BROWN,
WILLIAM B. VERITY.